3,415,929
OPHTHALMIC SOLUTION CONTAINING POLY-1,3-BETA-GLUCOSIDE

Leon Lachman, Millburn, and Pravin Sheth, Summit, N.J., assignors to Ciba Corporation, New York, N.Y., a corporation of Delaware
No Drawing. Filed July 14, 1965, Ser. No. 472,012
11 Claims. (Cl. 424—229)

The present invention concerns and has for its object the provision of an ophthalmic solution vehicle providing a prolonged duration of drug activity.

Ophthalmic solutions usually are short acting. In certain instances, such as glaucoma patients, the eye has to be medicated for long periods at prescribed intervals, for example, every 3 to 4 hours. In order to maintain the intraocular tension in these patients at a comfortable level, it would be considerably more convenient, if they had only to instill drops into their eyes once or twice a day, e.g. in the morning and evening, rather than four times during the day.

Therefore, considerable efforts have been spent to develop a vehicle for ophthalmic solutions which would cause the drug to exhibit a prolonged duration of therapeutic action. One of the outcoming results were, for example, the present use of methylcellulose, carboxymethylcellulose, hydroxypropylmethylcellulose or polysorbate for this purpose.

We have now found that the linear poly 1-3,-β-glucoside, containing on every third glucose moiety of the chain a 1,6-β-glucosido group, is highly efficient for the above outlined purpose, since it is non-toxic, non-irritating to the eye and yet when added in low concentrations to an ophthalmic solution causes the drug to exhibit a prolonged effect when tested, for example, in the rabbit's eye, as compared to the same solution without said additive.

Accordingly, the present invention concerns (a) an aqueous ophthalmic vehicle containing an effective amount of said poly-1,3-β-glucoside.
(b) an ophthalmic composition comprising a therapeutically acceptable, water soluble form of an eye medicament together with the vehicle mentioned under (a), and
(c) the use of said poly-1,3-β-glusoside in the preparation of ophthalmic compositions.

The poly-1,3-β-glucoside used according to the invention mainly has the following formula:

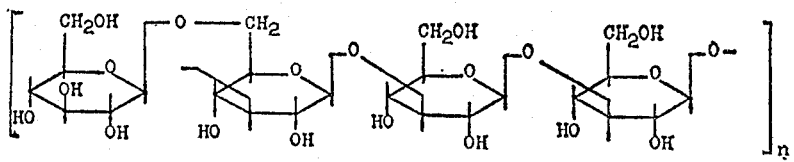

A preferred form there is that of which a 1% aqueous solution shows at 24° C. and in the pH-range between 6.8 and 7.5 a final viscosity (after 5 hours) of about 2400 to 3000 centipoises, measured with a Brookfield viscosimeter using a No. 3 spindle.

This poly-1,3-β-glucoside is used in the ophthalmic vehicle of the present invention in an amount ranging between about 0.05 and 5%, preferably between about 0.1 and 2% and advantageously between about 0.1 and 1.0%.

The eye medicament useful in the compositions of the invention may be an alkaloid, such as atropine, homatropine, scopolamine, physostigmine, pilocarpine and the like, a hormone, such as epinephrine, hydrocortisone, prednisolone, dexamethasone, triamcinolone and the like, an antibiotic, such as neomycin, gramicidin, polymixin, bacitracin and the like, or a chemotherapeutic agent, such as neostigmine, piperocaine, chlorpheniramine, phenylephrine, tetracaine, sulfacetamide, sulfisoxazole, idoxuridine, tetrahydrozoline, naphazoline, antazoline, echothiophate and the like, advantageously in the form of a water-soluble salt or another useful derivative thereof.

Specifically mentioned are atropine sulfate, homatropine bromide, scopolamine bromide, physostigmine salicylate, pilocarpine chloride, 1-epinephrine bitartrate, prednisolone 21-acetate or trimethylacetate, dexamethasone 21-phosphate, triamcinolone acetonide, neomycin sulfate, polymixin B sulfate, neostigmine maleate, phenylephrine chlorine, tetracaine chloride, sodium sulfacetamide, diethanolammonium sulfisoxazole, tetrahydrozoline chloride, naphazoline chloride, antazoline phosphate and echothiophate iodide.

Especially useful are compositions containing as the active ingredient physostigmine salicylate, homatropine hydrochloride or bromide, tropic acid amide and pilocarpine hydrochloride together with an aqueous vehicle containing said poly-1,3-β-glucoside.

The composition of the invention contain these medicaments in the known and useful concentration besides the poly-1-3,-β-glucoside, of which in most instances a content of about 0.5% is sufficient for the maximal effect.

The ophthalmic solutions according to the invention are generally prepared according to methods used in the art of manufacturing ophthalmic preparations, essentially by combining the specified proportions of the active ingredients as well as the poly-1,3-β-glucoside with pharmaceutically acceptable aqueous carrier solutions. These are either purified water alone or mixtures of water and water-miscible solvents, such as lower alkanols or aralkanols, e.g., ethanol or benzyl alcohol, lower alkylene glycols or polygilycols, e.g. ethylene glycol, propylene glycol, polyvinyl alcohol or polyethyleneglycol. Other ingredients that may be added to ensure stable solutions are, for example, stabilizers, such as thiourea, isoascorbic acid, creatinine, sodium thiosulfate, bisulfite or metabisulfite, monothioglycerol or thiosorbitol, any known chelating agents, such as ethylenediamine tetraacetic acid and its mono- or polysalts, sodium citrate or gluconate, buffers or buffer combinations, such as acetic acid, sodium acetate or sodium dihydrogenphosphate-disodium hydrogenphosphate, salts for making isotonic solutions, such as sodium chloride, preserving agents, such as sodium borate, phenylmercuric nitrate, benzalkonium chloride, thimerosal, methyl or propyl paraben and the like.

The following working examples are illustrative of the invention, but are in no way intended to limit its scope. Temperatures are given in degrees centigrade and all parts are parts by weight.

EXAMPLE 1

Formula

|  | Percent |
|---|---|
| Prednisolone 21-actate | 0.5 |
| Thimerosal | 0.001 |
| Poly-1,3-β-glucoside | 0.5 |
| Water for injection | Q.s. |

PROCEDURE

Dissolve the polyglucoside in 50% of the water for injection heated to 90° C. with constant stirring. Cool the solution to 40° C. and dissolve the thimerosal and prednisolone 21-acetate. Cool the solution to room temperature and bring up to volume with water for injection. Pass the solution through a suitable filter and fill into appropriate containers. Sterilize by autoclaving at 121° for 20 minutes.

EXAMPLE 2

Formula

| | Percent |
|---|---|
| Pilocarpine hydrochloride | 0.5 |
| Thimerosal | 0.002 |
| Poly-1,3-β-glucoside | 0.75 |
| Water for injection | [1] Q.s. |
| Sodium chloride | Q.s. |

[1] To adjust isotonicity.

PROCEDURE

Dissolve the polyglucoside in 50% of the water for injection heated to 90° with constant stirring. Cool the solution to 40° C. and dissolve the thimerosal and pilocarpine hydrochloride and the required amount of sodium chloride to adjust the isotonicity of the solution. Cool the solution to room temperature and bring up to volume with water for injection. Pass the solution through a suitable filter and fill into appropriate containers. Sterilize by autoclaving at 121° for 20 minutes.

EXAMPLE 3

Formula

| | Percent |
|---|---|
| Homatropine hydrochloride | 5 |
| Chlorobutanol | 0.5 |
| Poly-1,3-β-glucoside | 0.75 |
| Water for injection | [1] Q.s. |
| Sodium chloride | Q.s. |

[1] To adjust isotonicity.

PROCEDURE

Dissolve the polyglucoside in 50% of the water for injection heated to 90° C. with constant stirring. Cool the solution to 40° C. and dissolve the chlorobutanol and homatropine hydrochloride and the required amount of sodium chloride to adjust the isotonicity of the solution. Cool the solution to room temperature and bring up to volume with water for injection. Pass the solution through a suitable filter and fill into appropriate containers. Sterilize by autoclaving at 121° for 20 minutes.

EXAMPLE 4

Formula

| | Percent |
|---|---|
| Tropic acid amide | 0.5 |
| Phenylmercuric acetate | 0.002 |
| Poly-1,3-β-glucoside | 0.75 |
| Water for injection | Q.s. |

PROCEDURE

Dissolve the polyglucoside in 50% of the water for injection heated to 90° C. with constant stirring. Cool the solution to 40° C. and dissolve the phenylmercuric acetate and tropic acid amide. Cool the solution to room temperature and bring up to volume with water for injection. Pass the solution through a suitable filter and fill into appropriate containers. Sterilize by autoclaving at 121° for 20 minutes.

EXAMPLE 5

Formula

| | Percent |
|---|---|
| Physostigmine salicylate | 0.5 |
| Chlorobutanol | 0.15 |
| Soodium thiosulfate | 0.3 |
| Poly-1,3-β-glucoside | 1.0 |
| Water for injection | Q.s. |

PROCEDURE

Dissolve the polyglucoside in 50% of the water for injection heated to 90° C. with constant stirring. Cool the solution to 40° C. and dissolve the sodium thiosulfate, chlorobutanol and physostigmine salicylate. Cool the solution to room temperature and bring up to volume with water for injection. Pass the solution through a suitable filter and fill into appropriate containers. Sterilize by autoclaving at 121° for 20 minutes.

EXAMPLE 6

Formula

| | Percent |
|---|---|
| Sodium sulfacetamide | 15 |
| Poly-1,3-β-glucoside | 0.5 |
| Chlorobutanol | 0.15 |
| Water for injection | Q.s. |

PROCEDURE

Dissolve the polyglucoside in 50% of the water for injection heated to 90° C. with constant stirring. Cool the solution to 40° C. and dissolve the chlorobutanol and sodium sulfacetamide. Cool to room temperature and bring up to volume with water for injection. Pass the solution through a suitable filter and fill into appropriate containers. Sterilize by autoclaving at 121° for 20 minutes.

EXAMPLE 7

Formula

| | Percent |
|---|---|
| Sulfamethizole | 15 |
| Poly-1,3-β-glucoside | 0.75 |
| Water for injection | Q.s. |

PROCEDURE

Dissolve the polyglucoside in 50% of the water for injection heated to 90° with constant stirring. Cool the solution to 40° C. and dissolve the sulfamethizole. Cool the solution to room temperature and bring up to volume with water for injection. Pass the solution through a suitable filter and fill into appropriate containers. Sterilize by autoclaving at 121° for 20 minutes.

What is claimed is:

1. A solution comprising (a) about 0.05 to 5% of the linear poly-1,3-β-glucoside, containing on every third glucose moiety of the chain a 1,6-β-glucosido group and of which an 1% aqueous solution shows at 24° C. and in the pH range between 6.8 and 7.5 a final viscosity of about 2400 to 3000 centipoises, and (b) a pharmaceutically acceptable aqueous ophthalmic carrier solution.

2. A solution is claimed in claim 1, wherein the content of the poly-1,3-β-glucoside ranges between about 0.1 and 2%.

3. A solution as claimed in claim 1, whrein the content of the poly-1,3-β-glucoside ranges between about 0.1 and 1%.

4. A solution as claimed in claim 1, together with a therapeutically effective amount of a member selected from the group consisting of atropine sulfate, homatropine bromide, scopolamine bromide, physostigmine salicylate, pilocarpine chloride, 1-epinephrine bitartrate, prednisolone 21-acetate, prednisolone 21-trimethylacetate, dexamethasone 21-phosphate, triamcinolone acetonide, neomycine sulfate, polymixin B sulfate, neostigmine bromide, neostigmine methylsulfate, piperocaine chloride, chlorphemiramine maleate, phenylephrine chloride, tetracaine chloride, sodium sulfacetamide, diethanolammonium sulfisoxazole, tetrahydrozoline chloride, naphthazoline chloride, antazoline phosphate and echothiophate iodide.

5. A solution as claimed in claim 3, together with a therapeutically effective amount of physostigmine salicylate.

6. A solution as claimed in claim 3, together with a therapeutically effective amount of a member selected from the group consisting of homatropine hydrochloride and homatropine hydrobromide.

7. A solution as claimed in claim 3, together with a therapeutically effective amount of tropic acid amide.

8. A solution as claimed in claim 3, together with a therapeutically effective amount of pilocarpine hydrochloride.

9. A solution as claimed in claim 3, together with a therapeutically effective amount of prednisolone 21-acetate.

10. A solution as claimed in claim 3, together with a therapeutically effective amount of sodium sulfacetamide.

11. A solution as claimed in claim 3, together with a therapeutically effective amount of sulfamethizole.

References Cited

FOREIGN PATENTS 639,361   4/1964   Belgium.

ALBERT T. MEYERS, *Primary Examiner.*

D. A. MAHANAND, *Assistant Examiner.*